(12) United States Patent
Kitchens

(10) Patent No.: US 8,304,022 B1
(45) Date of Patent: Nov. 6, 2012

(54) COMPOSITION AND METHOD FOR PRODUCING IMPROVED FAUX FINISHES

(76) Inventor: Robert Westbrook Kitchens, Grayson, GA (US)

( * ) Notice: Subject to any disclaimer, the term of this patent is extended or adjusted under 35 U.S.C. 154(b) by 1093 days.

(21) Appl. No.: 12/074,627

(22) Filed: Mar. 5, 2008

Related U.S. Application Data

(60) Provisional application No. 60/905,755, filed on Mar. 8, 2007.

(51) Int. Cl.
*B05D 1/02* (2006.01)
*B05D 1/36* (2006.01)
*B05D 5/00* (2006.01)
*B05D 5/06* (2006.01)
*C09K 3/00* (2006.01)

(52) U.S. Cl. .................... 427/267; 427/262; 252/182.11

(58) Field of Classification Search .................. 427/262, 427/267
See application file for complete search history.

(56) References Cited

U.S. PATENT DOCUMENTS

| | | | | |
|---|---|---|---|---|
| 2,702,793 A | * | 2/1955 | Smith | 252/78.3 |
| 4,243,548 A | * | 1/1981 | Heeb et al. | 516/8 |
| 4,420,575 A | * | 12/1983 | Rapaport et al. | 523/504 |
| 4,482,662 A | * | 11/1984 | Rapaport et al. | 523/504 |
| 4,518,734 A | * | 5/1985 | Brouillette et al. | 524/378 |
| 2003/0100663 A1 | * | 5/2003 | Rink et al. | 524/507 |

\* cited by examiner

*Primary Examiner* — Peter F Godenschwager
(74) *Attorney, Agent, or Firm* — Denton Intellectual Property Law Firm, LLC; F. Russell Denton, Esq.

(57) ABSTRACT

The invention provides a polyacrylic-based aerosol top coat composition for rapid and economical application of decorative faux finishes on architectural surfaces. The composition dries rapidly, permits further texturing before it dries if desired, is esthetically superior to faux finish top coats made by methods in the prior art, and when dry provides a top coat that is mechanically tough. The invention is particularly useful for providing wood grain faux finishes, and for creating three-dimensional wood-like effects on a two-dimensional non-wood surface. The invention further provides a method wherein a base coat is applied directly to a surfactant-free surface of any of several architectural materials such as bare vinyl, after which the top coat composition is sprayed on reiteratively as needed. Other coatings such as primer coats and protective overcoatings are optional.

10 Claims, 2 Drawing Sheets

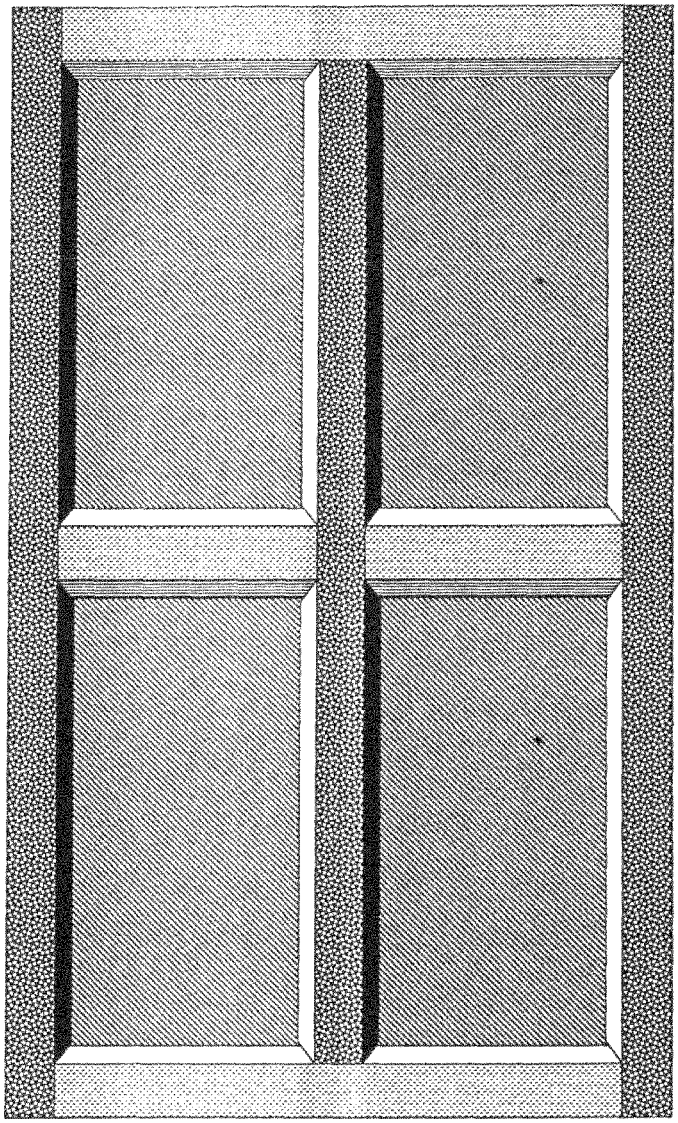
FIGURE 1: Illustrative two-dimensional pattern for providing the effect of raised cross pieces, by a faux finish on the flat monolithic veneer pane of a door with no cross pieces.

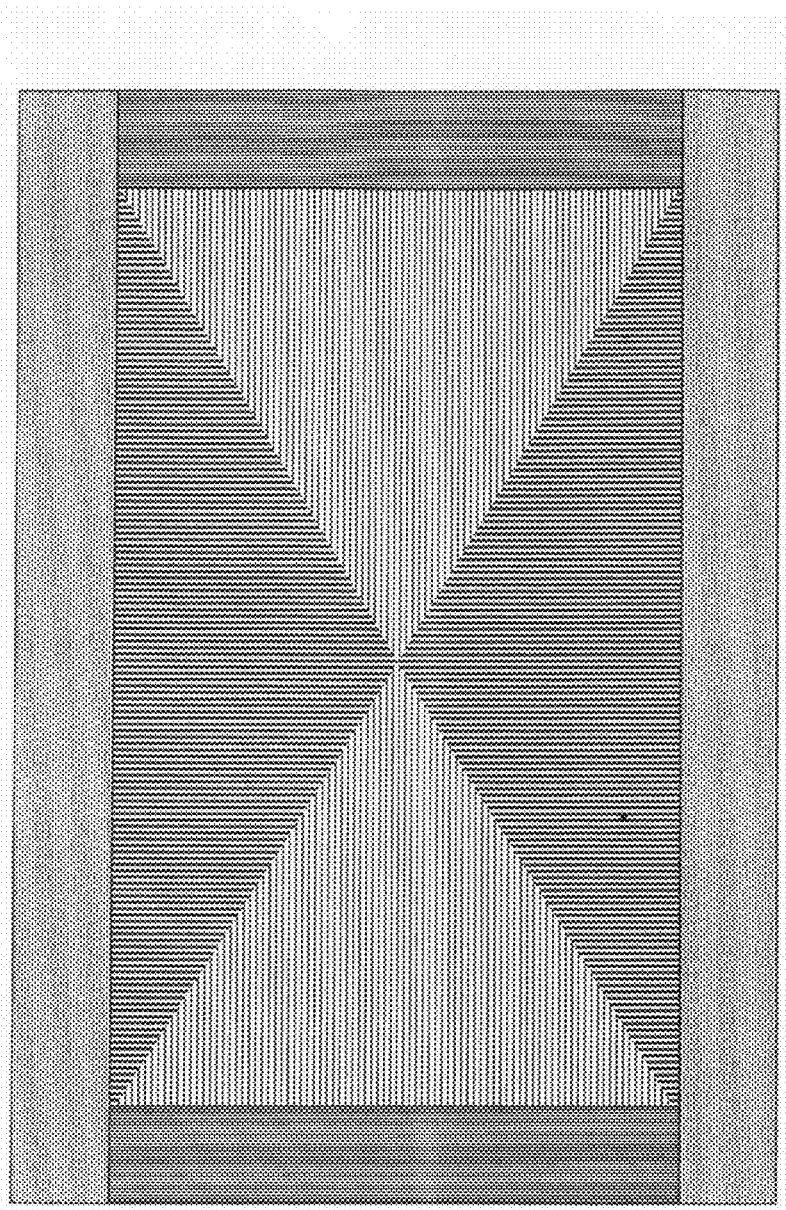
FIGURE 2: Illustrative two-dimensional pattern for providing the appearance of fitted wood on a unipanel cabinet door by a faux finish

COMPOSITION AND METHOD FOR PRODUCING IMPROVED FAUX FINISHES

RELATED APPLICATIONS

This application derives priority from U.S. provisional patent application No. 60/905,755, filed Mar. 8, 2007, the contents of which are incorporated herein by reference.

FIELD OF THE INVENTION

This invention pertains to improved coatings and methods for producing faux finishes on decorative architectural surfaces.

BACKGROUND

Faux finishes are decorative coatings that are widely used on architectural surfaces to add visual texture or create an illusion that the object is constructed of a different material, often a more costly and visually rich material. A wide range of surfaces may receive high quality faux finishes by modem methods, and may or may not be bare before the treatment. For instance, examples of bare surfaces that may receive a faux finish include exposed metal, wood, vinyl, laminate, fiberglass, and vitreous materials such as glass or ceramic tile. Alternatively, the surface to be treated may have a preexisting coating such as a varnish, shellac, glaze, latex paint, oil enamel paint, or polyurethane. Some types of surfaces such as poly(vinyl chloride) and other vinyl polymeric surfaces pose special difficulties for faux finishers because of poor adhesion to many categories of coatings.

In order to achieve good adhesion while obtaining the desired effect, faux finishes are commonly provided in a multi-step process. Generally a primer is applied as a first coating to ensure adhesion to the treated surface, followed by a base coat to impart a desired background color. One or more top coats is applied with tints and or special effects, for instance to imitate a walnut or cherry wood surface. A transparent or semi-transparent protective top coat may be needed as well. Usually each successive coating in the series must dry completely before the next coating is applied; the drying process can take 48 hours or more.

More specifically, the coating sequence is as follows. For faux finish primers it is common to apply a water-based product such as Zinsser 1-2-3™ primer or Kilz II™ primer, either of which adheres well to many types of surfaces, including wood, tile, metal, paint, lacquer and even vinyl. It is also common to sand the underlying surface before applying the primer, though for some materials clean surfaces may receive the primer and provide a good bond without a sanding step. The primer sometimes doubles as a base coat, and in that case it is common to tint it prior to application in order to obtain a three-dimensional visual effect after a subsequent step in which a semi-transparent textured top coat is applied. Base coats are typically brushed on; the brushing ensures evenness of application and enhances texturing effects such as wood grain. The top coat is generally a latex paint mixed with a tinted glazing liquid such as a Behr™ or Ralph Lauren™ household latex product, and is brushed on or applied with a graining tool. A clear protective coat such as water-based polyurethane is commonly applied over the top coat to enhance the luster and hardness of the finished surface. Although a variety of methods are used in faux finishing because of the diversity of the effects desired, the faux finish coating sequence tends to follow a common pattern: an ordinary primer, a tinted base coat, at least one top coat of latex paint mixed with glaze, and a protective coat of polyurethane.

A few professionals apply a white or tinted primer and then apply a gel stain for the top coat directly on the primer. Minwax™ gel stain or another oil-based gel stain is typically used in the industry for the top coat. This top coating is applied with a graining tool and allowed to dry for 24 to 48 hours, then repeated until the desired effect is achieved. The final transparent protective coat may be a polyurethane formulation which may be water-based, or may be an interior or exterior oil-based composition. More advanced techniques call for use of artist's oil paints, specialty brushes, and days of drying time.

Faux finishing processes suffer from a number of disadvantages. Surface preparation is tedious, especially where the exposed architectural surface is constructed of vinyl or another synthetic polymer. Also, some of the more advanced faux techniques are too labor-intensive to be economically worthwhile for many professional applicators. Even the step of brushing on top coats can be time-consuming and requires extraordinary care. And the long drying times are particularly problematic because they require substantial downtimes' for decorative projects; this forces professional applicators to spend a significant portion of their working time traveling between customer sites that are being managed in parallel, because nothing more can be done on a faux finish project while waiting for the latest stage of treatment to dry. Thus there is a need for improved formulations and methods for faux finishing.

SUMMARY OF THE INVENTION

The invention provides an improved top coat composition for rapid and economical application of high quality of faux finishes. The composition can be sprayed on, dries rapidly, permits further texturing before it dries if desired, provides superior esthetics to faux finish top coats made by methods in the prior art, and when dry provides a top coat that is mechanically tough. The invention is particularly useful for providing wood grain faux finishes, and for creating three-dimensional wood-like effects on a two-dimensional surface. In the invention method a base coat is applied to a clean surface, optionally without a primer and optionally with significant imperfections in the base coat. In particular embodiments, the base coat is brushed on or is sprayed on. A protective coat may be applied but is not required because the top coat is hard and bonds firmly to the underlying surface. Polyacrylic emulsions are among the preferred based coats, which optionally may contain added pigments and texturing solids. The top coat is comprised of acrylic polymers in water, and optionally may contain added pigments and texturing solids.

BRIEF DESCRIPTION OF THE FIGURES

FIG. 1 is a caricature depicting an illustrative embodiment of a two-dimensional pattern that provides a faux finish illusory effect of a paneled door with raised cross pieces.

FIG. 2 is a caricature depicting an illustrative embodiment of a two dimensional pattern that provides a faux finish illusory effect of mitered wood on a unipanel cabinet door.

DETAILED DESCRIPTION OF THE INVENTION

Surprisingly it has been found that applying a top coat as an aerosol spray onto a base coat can provide esthetic effects and physical properties that surpass the benefits of traditional brushed-on top coats. These top coats can dry in many cases in as little as 10 minutes at room temperature and typical household humidity, allowing for repeated applications in a short period of time, yet they dry slowly enough to permit brushing out of the surface for textural enhancement if desired. For re-brushing purposes the finishes can be formulated to dry more slowly, e.g., in 60 minutes at room temperature and 50% relative humidity. And because the composition is sprayed it can be used to obtain much more precise and realistic lines for special effects than can brushing, which is the longstanding method for applying faux finishes. The faux finishes of the invention can be applied to a variety of types of architectural surfaces, including wood, metal, vinyl, ceramic, glass and others.

The term architectural surface as used herein refers to structural and or decorative surfaces that are commonly found in buildings, including surfaces on doors, wall panels, cabinets, chair rails and other woodwork, tile, electrical boxes, ceramic fixtures, domestic appliances, glass, acoustic panels, pipes, wooden beams, I-beams, brick, cinder block, poured concrete, wallboard, clapboard, plywood, shingles, and other surfaces such as are commonly exposed and visible in or on buildings to those who live or work there. In a particularly useful formulation range the top coats of the invention have the following proportions by weight.

5-20% water
2-15% water-based acrylic resin, equivalent to about 0.5-9% polymer
2-15% low alkyl alcohol
10-30% high-volatility organic solvent
Up to 20% dye
5-20% surfactant
Up to 3% defoaming agent
20-50% propellant.

The acrylic resins employed must have a high enough polymer molecular weight to dry firm but not brittle; the principles for optimizing the choice of polymer modulus range for coating applications are well known in the art of paint formulations. As used here the term acrylic refers to polymers having structural units based on acrylic acid, low esters of acrylic acid such as methyl acrylate and ethyl acrylate and the like, and low alkyl acrylic compounds such as methacrylic acid and ethacrylic acid and their low alkyl esters. Ammoniated and otherwise neutralized polymers of acrylic acid and alkacrylic acid species enhance water solubility of the acrylic resins in the formulation. As used here the term acrylic resin includes: homopolymers of acrylic mers; random copolymers in which at least one of the mer components is an acrylic compound; block copolymers in which at least one of the blocks comprises acrylic mers; polymer blends in which at least one component of the blend is an acrylic homopolymer, acrylic copolymer, or acrylic block copolymer as just defined; and other acrylic polymer permutations such as are known in the polymer arts, such as star polymers and dendritic polymers. In a particular embodiment of the invention the acrylic resin contains styrene mers in random or block copolymers or in blends. The acrylic resins may or may not be cross-linked before application in a top coat; in a particular embodiment they are not cross-linked. An acrylic polymer molecular weight in the range of 40,000 to 150,000 atomic units is particularly desirable. Water based emulsions of the acrylic resins are particularly desirable for the present invention.

A particularly suitable water-based acrylic resin emulsion that has been found to work particularly well in the present invention is JONCRYL 60™, which is an aqueous, ammoniated, styrene-acrylic resin product of the BASF company; that product contains 34% solids, 0.1 to 1.0% unreacted 30% ammonium hydroxide, and very low amounts of volatile organic compounds; its polymers have a mid range molecular weight. However the invention is not limited to the use of JONCRYL 60™. Another commercially available acrylic resin products that may be used for the present invention is JONCRYL 678™. Also useful is JONCRYL 134™, comprising by weight: 30-40% styrene acrylic polymers, 60-70% water, 1-2% ammonium hydroxide, 1-5.5% urea, and 1-3% polyoxyethylene block copolymer. Another resin products that may be used for the present invention is JONCRYL 690™; because of its higher molecular weight and subsequent viscosity increase this product should be used with more dilute and or less viscous solvent compositions when formulating the aerosol composition. Other acrylic emulsion resins that can be useful from this series include JONCRYL 77™ and JONCRYL 89™. JONCRYL 89™ comprises by weight: 40-50% styrene acrylic polymers, 2-3% ammonium hydroxide, <2% polypropylene glycol, and <0.2% styrene.

Another series of acrylic solution resins that is suitable for the invention is sold by Lubrizol Advanced Materials under the trade name CARBOSET™. In particular, CARBOSET GA-1931™ is a clear amber solution of styrene acrylic copolymer in ammonia water, pH 8.8, has an acid number on solids of 190, is 100% soluble in water, and has a boiling point of 100° C., a freeze point of 0° C. at a specific gravity of 1.1-1.2, a vapor pressure of 17 mm Hg, and a vapor density of 0.62. CARBOSET GA-1931™ contains less than 1% ammonia, less than 0.7% acrylic acid, less than 0.1% styrene, and less than 1% isopropyl alcohol. CARBOSET GA-1931™ has total solids of 41% by weight and 34.5% by volume; a pH of 8.5-9.2; a Brookfield viscosity in the range of 3500 to 5000 cps at 25° C. This particular product is attractive because of its handling characteristics, high gloss, pigment wetting ability, gloss and resolubility, enhancement of flow and leveling, and pigment dispersion properties.

Other useful acrylic solution resins from the CARBOSET™ series that are useful for the invention include CARBOSET GA1926™, CARBOSET GA-1993™, CARBOSET XPD-2091™. CARBOSET GA1926™ is an acrylic copolymer in ammonia water. CARBOSET GA-1993™ is a styrene/acrylic copolymer in water with neutralized ammonia, and contains no less than 1% ammonia and less than 0.05% styrene. CARBOSET XPD-2091™ comprises 45-55% acrylic polymer, 45-55% water, <0.01% acrylic acid, <0.01% styrene, and <0.1% isopropanol. CARBOSET XPD-2091™ is 100% soluble in water. Other useful acrylic copolymer resins include CARBOSET GA-1161™ and CARBOSET GA-1162™. Additionally, CARBOSET GA-1166™ is a useful styrene acrylic copolymer dispersion in ammonia water, is soluble in alkaline water, and has the following properties: a pH of 8.2 to 9.2, a boiling point of 100° C. a vapor pressure of 17, a freeze point of 0° C., a vapor density of 0.62, and a specific gravity of 1.05 to 1.1. CARBOSET™ products GA-1086 and GA-1087 contain less than 0.5% acrylic acid, less than 0.25% isopropyl alcohol, and less than 0.05% styrene, and have the following properties: 48-49% total solids by weight, a pH of 8.6; a glass transition temperature of 40° C. and 105° C., respectively; a viscosity of 650-800 cps at 25° C. (Brookfield); and an acid number on solid of 50. GA-1086 and GA-1087 are translucent, high gloss and fast drying. GA-1086 exhibits excellent adhesion to various substrates including flexible films and non-porous material and is water resistant upon drying. CARBOSET GA-1087™ has excellent alcohol compatibility and is useful especially on porous surfaces.

Other acrylic emulsion resins and products from other manufacturers of acrylic resins are also contemplated for use with the invention. Acrylic resins that serve the purposes of flexographic inks and ink jet inks are particularly attractive for use with the invention.

The emulsions described above can be enhanced as desired with up to 10 weight % of an acrylic-cutting diluent that contains an amine. In another embodiment the diluents is 2 to 8 weight % of the emulsion, and in a further embodiment the diluent represent about 5 weight % of the emulsion. Acrylic solution resins with acid numbers of 180 or more have particularly desirable properties in this respect, though resins having acid numbers of 70 or lower can be effective. The acrylic-cutting diluent containing an amine can comprise one or more of monoethanolamine (MEA), dimethanolamine (DMEA), triethanolamine (TEA), morpholine, propylene glycol, polypropylene glycol, and ammonia (NH3). Particularly good results are anticipated when ammonia (NH3) is present.

Suitable low alkyl alcohols for the invention include but are not limited to: methanol, ethanol, iso- and n-propanol, and the isomers of butanol, of pentanol and of hexanol. Suitable high-volatility organic solvents include but are not limited to: methylal, diethoxymethane, methyl ethyl ether, diethyl ether, tetrahydrofuran, tetrahydropyran, 1,3-dioxane, 1,4-dioxane, and 1,2-dimethoxy ethane. Suitable dyes include but are not limited to those common in the art of obtaining desired pigments and tints for architectural coatings; exemplary dyes are available at finisher supply houses such as Wood Finisher's Supply, 1454 Field Park Circle, Marietta, Ga. 30066, (800) 451-0678. Suitable surfactants include but are not limited to: hydroxyalkyl ether compounds such as ethyl cellosolve, propyl cellosolve, butyl cellosolve, 1-hydroxy, 3-ethoxy propane, 2-hydroxy, 3-ethoxy propane and the like. Suitable defoaming agents include but are not limited to: hydrophobic polymers such as alkyl polysiloxanes, including methyl silicones such as polydimethylsiloxane, as well as ethyl silicones, and phenyl silicone polymers. Suitable propellants include but are not limited to: volatile hydrocarbons including propane, n-butane, isobutene, dimethyl ether, methyl ethyl ether, nitrous oxide, carbon dioxide, 1,1,1,2-tetrafluoroethane, 1,1,1,2,3,3,3-heptafluoropropane, combinations thereof, and other propellants such as are commonly used in the art of aerosol formulation.

In a particular embodiment the invention formulation comprises 5 to 20 weight % water; in another embodiment it comprises 7 to 17 weight % water; in yet another embodiment it comprises 8 to 15 weight % water; in a further embodiment it comprises 10 to 12 weight % water; in still another embodiment it comprises about 10 weight % water.

In one embodiment, the invention formulation comprises 2 to 15 weight % acrylic resin; in another embodiment it comprises 3 to 12 weight % acrylic resin; in yet another embodiment it comprises 4 to 9 weight % acrylic resin; in a further embodiment it comprises 5 to 6 weight % acrylic resin; in still another embodiment it comprises about 5 weight % acrylic resin.

In another particular embodiment the invention formulation comprises 2 to 15 weight % low alkyl alcohol; in another embodiment it comprises 4 to 12 weight % of the alcohol; in yet another embodiment it comprises 6 to 9 weight % of the alcohol; in a further embodiment it comprises 8 to 9 weight % of the alcohol.

In another particular embodiment the invention formulation comprises 10 to 30 weight % of the high-volatility organic solvent; in another embodiment it comprises 15 to 25 weight % of the solvent; in yet another embodiment it comprises 17 to 23 weight % of the solvent; in a further embodiment it comprises 18 to 21 weight % of the solvent; in a different embodiment it comprises 19 to 20 weight percent of the solvent.

In some embodiments the invention formulation comprises up to 20 weight % dye, wherein the dye may comprise more than one dye. In another embodiment in another embodiment it comprises 5 to 15 weight % of dye. In yet another embodiment it comprises 7 to 14 weight % of dye. In a further embodiment it comprises 9 to 12 weight % of dye; in a different embodiment it comprises about 10 to 12 weight % of dye.

In one embodiment the invention formulation comprises 5 to 20 weight % surfactant. In another embodiment it comprises 7 to 18 weight % surfactant. In yet another embodiment it comprises 9 to 16 weight % surfactant. In a further embodiment it comprises 11 to 14 weight % surfactant. In still another embodiment it comprises 12 to 13 weight % surfactant.

In a particular embodiment the invention formulation comprises up to 3 weight % defoaming agent; in another embodiment it comprises 0.1 to 2 weight % defoaming agent; in yet another embodiment it comprises 0.2 to 1.5 weight % defoaming agent; in a further embodiment it comprises 0.3 to 1 weight % defoaming agent; in still another embodiment it comprises 0.4 to 0.7 weight % defoaming agent. In a further embodiment it comprises about 0.5 weight % defoaming agent.

In another embodiment the invention formulation comprises up 20 to 50 weight % propellant. In a further embodiment it comprises 22 to 40 weight % propellant. In yet another embodiment it comprises 24 to 35 weight % propellant; in a further embodiment it comprises 26 to 33 weight % propellant; in still another embodiment it comprises 28 to 31 weight % propellant. In a further embodiment it comprises about 30 weight % propellant.

Exemplary compositions are as follows, and are intended to be illustrative of compositions by weight. Illustrative composition I has been found to be particularly effective for the invention compositions. Optimally the amounts of water, water-based acrylic resin, alcohol, dye, and surfactant each comprise between about 8 and 12 weight % of the composition, the organic solvent is in the range of 18-24 weight %, the propellant is in the range of 25 to 35 weight %, and the composition contains up to 1 weight % of defoaming agent. The invention is not, however, limited to these ranges or to the formulations in the illustrative compositions.

Illustrative Composition I:
   10 parts water
   3 parts ammoniated acrylic resin (JONCRYL 60™, parts referring to the polymer only)
   8.5 parts SDA-40B pure ethanol
   19 parts methylal
   12 parts brown dye
   0.01 parts black dye
   12 parts butyl cellosolve
   0.5 parts methyl silicone
   30 parts dimethyl ether.

Illustrative Composition II:
   13 parts water
   2.5 parts acrylic resin (JONCRYL 134™, parts referring to the polymer only)
   12 parts n-propanol
   15 parts 1,4-dioxane
   10 parts brown dye
   0.1 parts red dye
   0.2 parts yellow dye
   0.1 parts black dye 15 parts 1-hydroxy, 3-ethoxy-propane
1 part ethyl silicone
25 parts methyl ethyl ether.

Illustrative Composition III:
9 parts water
1 part acrylic resin (CARBOSET GA-1931™, parts referring to the polymer only)
7 parts tert-butanol
18 parts methyl ethyl ether
13 parts brown dye
0.5 parts black dye
9 parts ethyl cellosolve
1 part ethyl silicone
50 parts propane.

Illustrative Composition IV:
12 parts water
5 parts acrylic resin (CARBOSET GA-1166™, parts referring to the polymer only)
9 parts iso-propanol
25 parts tetrahydrofuran
20 parts brown dye
9 parts 2-hydroxy, 3-ethoxy propane
0.2 parts phenyl silicone
40 parts isobutene.

Illustrative Composition V:
20 parts water
3 parts acrylic resin (CARBOSET GA-1993™, parts referring to the polymer only)
5 parts methanol
13 parts 1,3-dioxane
4 parts yellow dye
4 parts red dye
7 parts propyl cellosolve
0.3 parts methyl silicone
25 parts 1,1,1,2-tetrafluoroethane Method of Application Proper preparation of the architectural surface and the base coat is important to the appearance and performance of the top coat. The architectural surface should be clean of substances such as wax, grease and silicones before the faux finish is applied, and should be substantially free of cleaning residues such as surfactants. Non-foaming ammonia or household cleaning products such as Formula 409™ and Krud Kutter™ are suitable for preparing the architectural surface. Variations in cleaning methods can be effective, but a particularly useful one here is, after cleaning with one of these products, to rinse or wipe the affected surface clean with clear water until all of the degreaser is removed, and then to wipe the surface dry. This type of cleaning is effective both for coated and uncoated surfaces, and suffices for the preparation of even vinyl surfaces.

Surprisingly, after cleaning architectural surfaces with a surfactant-free cleaning composition, base coats can be applied directly with good adhesion without sanding the surface even on a "slick" uncoated architectural surface such as vinyl. A number of products have been found here to serve as good base coats for the invention method, including Minwax Polycrylic™ satin and Minwax™ polyurethane products. These finishes are milky while being brushed on but thy clear and non-yellowing, and have low odor. Primers such as Zinsser 1-2-3™ and Kilz II™ also serve well as base coats, as do polyacrylic and polyurethane products from other vendors. The base coat can be colored with a dye before application, and may have texture-adding substances such as fibers or grains mixed in before application. The base coats can be sprayed, however rapid brushing—instead of or following spray coating—with a stiff brush in the direction of the desired wood grain enhances the appearance provided by base coats and provides straight grain lines. Surprisingly, base coats that are brushed on with accidental imperfections often do not detract from the overall appearance once the top coat of the invention has been sprayed on. Primer-as-base-coat compositions such as Zinsser 1-2-3™ and Kilz II™ dry quickly, as do polyacrylic emulsions such as Minwax Polycrylic™, in contrast oil-based products. Typically the coats dry in 30 to 40 minutes, often the initial part of a coating is dry before the application of the respective coating has been completed. A second coat may be applied to ensure there are no gaps in the coverage.

Once the base coat has been applied and is dry to the touch, i.e., within 30 minutes or less, the top coat aerosol composition can be sprayed on. The top coat aerosol composition should be shaken vigorously (e.g., 100 shakes) to ensure thorough mixing before spraying. The spraying is optimally done in several passes, and the area to be sprayed should be sprayed only lightly each time, also making provisions for an overspray zone. After the first spraying the deposited layer is not at first visible. The drying time depends on the formulation, but for example the spraying of thin layers has been found to be repeatable at 10-minute intervals for Formula I above. During spraying the can should be moving constantly in order to avoid dark areas and or runs. Where such flaws do appear, they may be erased by brushing in the direction of the faux wood grain.

The gradual deposition of color through reiterative spraying of the invention compositions provides a more three-dimensional appearance of shadows than is typically achievable by prior art methods for faux finishes. The illusion of shadows produced in this manner on flat surfaces are astonishing. The illusion of wooden floral motifs or other motifs in bas relief can be produced in a similar way.

The use of sprays has another advantage over existing faux finish top coats and application methods. One of the most accurate ways to create a crisp linear interface between zones of color with a paint brush is to tape the surface of interest, e.g. a door, such that the edge of the tape defines the line to be created. However the spreading action of paint brushes forces their paint into surface crevices, and thus it is common to find that paint has seeped under the tape, especially on a rough or porous surface, and this can ruin the effect or require significant amounts of rework. By contrast, it has been found for the present invention that spraying results in little or no seepage under tape-masked surfaces. Without being limited by theory it is believed that the static pockets of air in crevices under the tape act as aerodynamic barriers to penetration by the airborne spray. As a result, faux board edges can be created by spraying in directions orthogonal to tape lines without requiring rework, and perpendicular or other geometric interfaces of faux grain lines can be created to imitate abutting fitted boards with a remarkably realistic appearance yet with surprising ease and speed. Thus, in a matter of hours a monolithic veneer pane on one side of a hollow institutional door was treated by the invention method to create an illusion of mitered boards that could not be detected as a faux finish by observers without deliberate inspection.

The most important phase in creating such effects is typically the last few coats of a serial reiteration of spraying and drying. That is, the architectural surface receives a number of reiterative thin applications of the top coat until the surface as a whole is only moderately lighter than the desired final color. The illusion of shadows for raised surfaces or demarcation lines for illusory fitted boards is then created by spraying the top coat over tape-masked zones in serial fashion until the more heavily-sprayed zones are sufficiently dark to appear as shadowed or so that the line between zones appears to be the abutment of fitted boards. To simplify handling, "safe release" tape is preferred where tape is needed, and the tape may hold a paper mask over one or more lighter color zones to prevent overspray and maintain the sharpness of the sprayed lines. These line effects are addressed with only the last few top coat iterations because the crispness of faux lines in the invention method enable improved visual effects to be achieved with relatively modest transitions in shading and texture. The project is essentially dry and ready for ordinary use within a few minutes of completion of the final top coat application. If desired, a protective coat can be applied but has not been found to be necessary for interior applications.

FIGS. 1 and 2 are caricatures illustrating the effects that can be achieved with the invention and composition method because of the sharpness of the lines and color zone delineations they offer; these caricatures exaggerate the demarcations for purposes of illustration. FIG. 1 is an illustrative two-dimensional pattern depicting a faux finish illusory effect of a paneled door with raised cross pieces. FIG. 2 is an illustrative two dimensional pattern depicting a faux finish illusory effect of mitered wood on a unipanel cabinet door; this also illustrates some of the improved effects that have been achieved at the boundaries between faux grain zones. Because of the inability to create crisp contrasts such as these, faux effects have traditionally been limited to more muted imitations of surfaces. Note that shaded areas do not need to be a single solid color, but with manually differential spraying one part of a color zone can be made darker than another. Shading with distinct contours can also be used to create two-dimensional rosettes or other decorative features that appear to be in bas relief on an otherwise flat surface.

The invention method has been used with good results, and provides excellent coverage even for white and off-white substrates including vinyl-clad cabinets, painted surfaces, lacquered surfaces, tables, chairs, mantles, and so forth. For instance, the pattern in FIG. 2 was used to create a wood-like appearance on a white vinyl-clad cabinet door. There the top coat composition was the same as in illustrative composition I, above, where the 12 parts brown dye consisted of the non-grain-raising (NGR) color Walnut NG 1405 from Wood Finisher's Supply, 1454 Field Park Circle, Marietta, Ga. 30066, (800) 451-0678. An extra dark walnut dye was comparably prepared using a combination of 0.01 parts Black NG 930 and Extra Dark Walnut 1403 from the same supplier. The top coats of the invention resist fading, chipping and peeling even after prolonged heavy use of the underlying substrate, such as for vinyl-clad cabinet doors.

Variations

Although specific embodiments of the present invention have been described above in detail; the description is merely for purposes of illustration. In addition to the embodiments above various modifications of, and equivalent elements and steps corresponding to, the disclosed aspects of the exemplary embodiments, can be made by those skilled in the art without departing from the spirit and scope of the present invention defined in the following claims, the scope of which is to be accorded the broadest interpretation so as to encompass such modifications and equivalent structures.

I claim:

1. A composition for faux finishing top coats wherein:
    a) the composition is provided as an aerosol composition which before being sprayed comprises:
        i) 10 parts water;
        ii) 8 parts water-based styrene acrylic resin;
        iii) 8.5 parts ethanol;
        iv) 21 parts methylal;
        v) up to 20 parts dye;
        vi) 12 parts butyl cellosolve;
        vii) 0.5 parts methyl silicone; and
        ix) 30 parts dimethyl ether;
    b) wherein after spraying the composition can be brushed before drying, and dries in 60 minutes or less at room temperature and 50% relative humidity; and
    c) wherein the composition upon drying can provide an illusion of texture and or shadow on an architectural surface.

2. A method for applying faux finishes wherein:
    a) a clean architectural surface is provided substantially free of surfactant residues;
    b) a base coat is applied to the clean architectural surface, wherein the base coat optionally contains a pigment corresponding to a desired background color, and wherein the base coat is optionally brushed onto said surface; and
    c) a faux finish top coat composition according to the aerosol composition of claim 1 is applied to the base coat by spraying.

3. The method of claim 2 wherein the architectural surface is a surface of a door, wall panel, cabinet, chair rail or other woodwork, tile, electrical box, ceramic fixture, domestic appliance, glass, acoustic panel, pipe, wooden beam, I-beam, brick, cinder block, poured concrete, wallboard, clapboard, plywood, or shingle.

4. The method of claim 2 wherein the architectural surface is a bare surface of exposed metal, wood, vinyl, laminate, fiberglass, glass or ceramic tile.

5. The method of claim 2 wherein the architectural surface has a preexisting coating of varnish, shellac, glaze, latex paint, oil enamel paint, or polyurethane.

6. The method of claim 2 wherein the architectural surface is substantially free of wax, grease, and silicones.

7. The method of claim 2 wherein the base coat is a primer, a polyacrylic aqueous composition, or polyurethane aqueous composition.

8. The method of claim 2 wherein the aerosol composition is applied reiteratively in a series of rapidly drying top coats.

9. The method of claim 8 wherein the reiterative application is applied nonuniformly to provide faux shadows.

10. The method of claim 2 wherein the aerosol composition is sprayed across a tape-masked surface to provide a precise line for faux grain boundaries.

* * * * *